April 14, 1925.
A. A. McISAAC
NONSKID WHEEL
Filed April 1, 1924
1,533,935
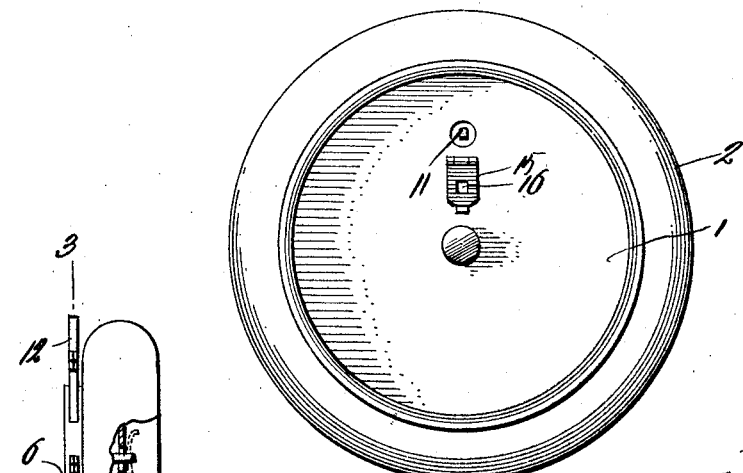
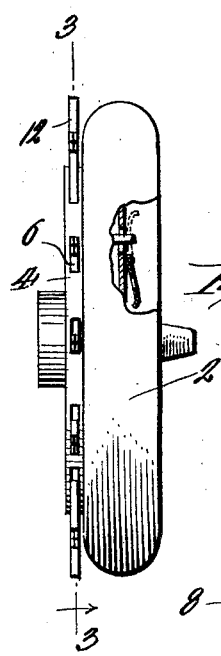
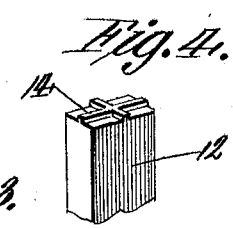
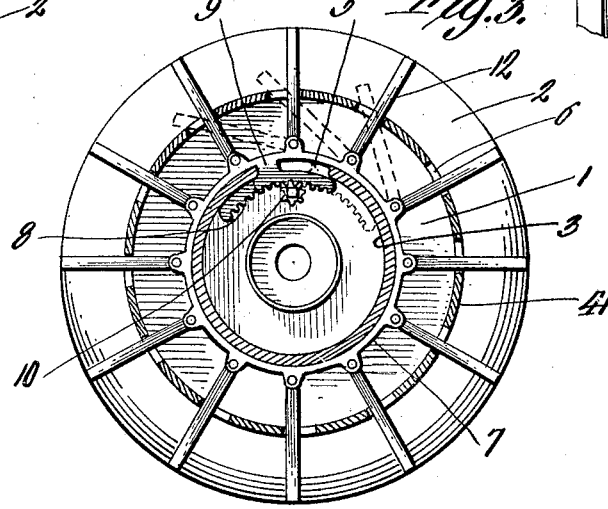
WITNESSES
Inventor
ARCHY A. MCISAAC
Attorney Patented Apr. 14, 1925.

1,533,935

UNITED STATES PATENT OFFICE.

ARCHY ANGUS McISAAC, OF INVERNESS, NOVA SCOTIA, CANADA.

NONSKID WHEEL.

Application filed April 1, 1924. Serial No. 703,511.

*To all whom it may concern:*

Be it known that I, ARCHY A. McISAAC, a subject of the King of Great Britain, residing at Inverness, in the Province of Nova Scotia and Dominion of Canada, have invented certain new and useful Improvements in Nonskid Wheels, of which the following is a specification.

The present invention appertains to a nonskid wheel for automobiles and the like and has for its principal object to provide nonskid means in conjunction with a wheel which means may be operated to an active or inactive position with comparative ease thus eliminating the necessity of using the ordinary nonskid chain.

Another important object of the invention is to construct a wheel of this nature possessed of a simple and efficient construction, one which is reliable in use, inexpensive to manufacture, durable, and well adapted to the purpose for which it is designed.

With the above and numerous other objects in view as will appear as the description progresses, the invention resides in certain novel features of construction, and in the combination and arrangement of parts as will be hereinafter more fully described and claimed.

In the drawing:

Figure 1 is a side elevation of the wheel embodying my invention,

Figure 2 is an edge elevation thereof partly broken away,

Figure 3 is another side elevation thereof partly in section showing the device from an opposite side to that shown in Figure 1, and Figure 4 is a fragmentary detail perspective of one end of one of the nonskid rods.

Referring to the drawing in detail it will be seen that the wheel 1 may be of any preferred construction having thereon the usual tire 2. A fixed rim 3 is provided on one side of the wheel adjacent its hub portion and another fixed rim 4 is provided on the wheel outside of the rim 3 adjacent the inside of the tire 2. The inner rim 3 is provided with a single slot 5 while the outer rim 4 is provided with a plurality of slots 6 spaced circumferentially about the rim at equal distances from each other.

A rotatable ring 7 is movable about the inner rim 3 and a semi-circular rack 8 is fixed thereto, the shank 9 thereof extending through the slot 5. A pinion 10 is mounted on a shaft 11 extended through the wheel and terminating in a square end at the other side thereof from the pinion. This pinion meshes with the rack 8 so that the ring 7 may be partially rotated. A plurality of anti-skid rods 12 project one through each slot 6 and are pivotally engaged with the rim 7 at spaced equal intervals. When the rods are positioned as shown in Figure 3 they are in their active positions and the outer ends thereof are provided with anti-skid cleats 14 shown to advantage in Figure 4. By rotating the shaft 11 the rack 8 may be moved so as to rotate the ring 7 thus removing the rods 12 to the dotted line position in Figure 3 that is the inactive position. The ends of the rods when in an active position are substantially flush with the tread of the tire 3 so as to engage the ground and prevent skidding of the wheel.

A hinged leaf 15 is provided on the wheel on the opposite side from that to which is attached the rims 3 and 4 and is provided with a square opening 16 so that it may be engaged over the squared end of the shaft 11 and thus will lock this shaft against rotation.

It is thought that the construction and operation of the invention will be readily understood without any more detailed description thereof. It is desired, however, to point out the numerous changes in the details of construction, and in the combination and arrangement of parts may be resorted to without departing from the spirit or scope of the invention as hereinafter claimed or sacrificing any of its advantages.

Having thus described my invention, what I claim as new is:

1. In combination, a wheel, an inner rim fixed to the wheel, an outer rim fixed to the wheel, said outer rim provided with a plurality of slots, a ring rotatable about the inner rim, a plurality of rods extending through the slots, and pivotally connected to said ring.

2. In combination, a wheel, an inner rim fixed to the wheel, an outer rim fixed to the wheel, said outer rim provided with a plurality of slots, a ring rotatable on the inner rim, rods pivotally connected to the ring and projecting through the slots of the outer rim, and means for moving the ring so that the rods may be moved to an active or inactive position.

3. In combination, a wheel, an inner rim fixed to the wheel, an outer rim fixed to the wheel, said outer rim provided with a plurality of slots, a ring rotatable on the inner rim, rods pivotally connected to the ring and projecting through the slots of the outer rim, means for moving the ring so that the rods may be moved to an active or inactive position, and a mechanism for holding said means against accidental operation.

4. In combination, a wheel, an inner rim fixed to the wheel, an outer rim fixed to the wheel, said outer rim provided with a plurality of slots, said inner rim provided with a single slot, a ring rotatable about the inner rim and provided with a semi-circular rack disposed within the inner rim extending through the slot thereof, a pinion, a shaft for rotation of said pinion, said pinion meshing with said rack, a plurality of rods pivoted to the ring and passing through the slots of the outer rim.

5. In combination, a wheel, an inner rim fixed to the wheel, an outer rim fixed to the wheel, said outer rim provided with a plurality of slots, said inner rim provided with a single slot, a ring rotatable about the inner rim and provided with a semi-circular rack disposed within the inner rim extending through the slot thereof, a pinion, a shaft for rotation of said pinion, said pinion meshing with said rack, a plurality of rods pivoted to the ring and passing through the slots of the outer rim, and means for preventing rotation of said shaft.

6. In combination, a wheel, an inner rim fixed to the wheel, an outer rim fixed to the wheel, said outer rim provided with a plurality of slots, said inner rim provided with a single slot, a ring rotatable about the inner rim and provided with a semi-circular rack disposed within the inner rim extending through the slot thereof, a pinion, a shaft for rotation of said pinion, said pinion meshing with said rack, a plurality of rods pivoted to the ring and passing through the slots of the outer rim, means for preventing rotation of said shaft, the outer ends of said rods provided with non-skid cleats.

7. In combination, a wheel, an inner rim fixed to said wheel and provided with a slot, an outer rim fixed to said wheel and provided with a series of slots arranged at intervals thereabout, a ring rotatable about the inner rim, a semi-circular rack, a shank extending through the slot of the inner rim and connecting the rack to the ring, a plurality of rods pivoted to the ring and extending through the slots of the outer rim, a pinion meshing with the rack, and means for rotating the pinion.

8. In combination, a wheel, an inner rim fixed to said wheel and provided with a slot, an outer rim fixed to said wheel and provided with a series of slots arranged at intervals thereabout, a ring rotatable about the inner rim, a semi-circular rack, a shank extending through the slot of the inner rim and connecting the rack to the ring, a plurality of rods pivoted to the ring and extending through the slots of the outer rim, a pinion meshing with the rack, means for rotating the pinion, and a mechanism for preventing accidental operation of said means.

In testimony whereof I affix my signature in presence of two witnesses.

ARCHY ANGUS McISAAC.

Witnesses:
W. D. LAURENCE,
MALCOLM DUGGAN.